T. C. LORD.
Barb-Fence.

No. 218,290. Patented Aug. 5, 1879.

Witnesses:
Thos. H. Hutchins
Wm. J. Hutchins

Inventor:
Tyler C. Lord

UNITED STATES PATENT OFFICE.

TYLER C. LORD, OF JOLIET, ILLINOIS.

IMPROVEMENT IN BARB-FENCES.

Specification forming part of Letters Patent No. 218,290, dated August 5, 1879; application filed June 9, 1879.

*To all whom it may concern:*

Be it known that I, TYLER C. LORD, of the city of Joliet, in Will county and State of Illinois, have invented certain new and useful Improvements in Barb-Fences, the construction and operation of which I will proceed to explain, reference being had to the annexed drawings, making a part of this specification, in which—

Figure 1:
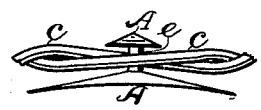
Figure 2:
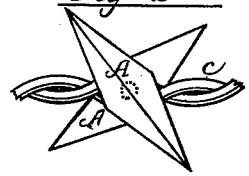
Figure 3:
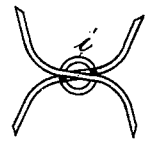
Figure 4:
Figure 5:
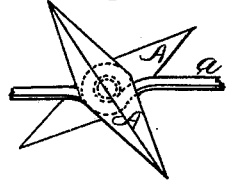

Figure 1 is a plan view on the top; Figs. 2 and 5, side elevations; Fig. 3, an end view, and Fig. 4 a plan view on the top of a blank barb.

The object and nature of my invention consist in the construction of the barbs in such a manner that they will rotate in the direction of the length of the fence, so that when an animal comes in contact with one, especially in an oblique direction, it will revolve, so it will not tear the animal or break off the fence.

In the drawings, A represents a diamond-shaped piece of metal, long enough for a barb, sharp at either end, and connected with each other at their center by a shaft, $e$, shown in Fig. 1, which shaft is inclosed by the two strands of the wire of the fence, $c$, as is shown particularly in Figs. 1 and 2. This shaft $e$ will rotate between the two wires of the fence, $c$, which forms a sort of spur-wheel of the two barbs A, so that should an animal come in contact with it, it will roll and not tear the animal, and be quite as effective as if stationary. These barbs may have more or less points, and may be used either between the two strands of the wire $c$ or on a single wire, as shown in Fig. 5. When used with a single wire, the wire takes a bend around the shaft $e$, as is shown in Fig. 5.

These barbs may be made of any suitable material for the purpose. When constructed of wrought metal the blanks may be cut out, as is shown in Fig. 4, with two central tongues, $i$, which may be bent in such a manner as to form the central shaft, $e$, as is shown in Fig. 3 at $i$.

The great objection to barb-fences has been that the rigid fixed barbs injure stock and are very dangerous. All this objection is overcome by having the barb rotate, as in this case. It will be seen that they cannot tear an animal should he run against them, as they revolve, and allow him to pass on with only a prick, while he would be torn by a rigid fixed barb.

I am aware that a spool has been used, strung on a wire or wires, so as to revolve around the wire, and having barbs, but not with the length of the wire, as in this case, or having a central shaft to unite the two parts of the barb. Hence I do not claim a spool or any device that rotates around the wire.

Having thus described my invention, what I claim as new, and desire to secure by Letters Patent, is as follows, to wit:

1. The barb A, having the central connecting-shaft, $e$, in combination with the two-strand wire cable $c$, and so intertwisted between the strands of the cable $c$ that the barb A may revolve in the direction of the length of the cable, in the manner and for the purpose set forth.

2. The barb A, having the central connecting-shaft, $e$, in combination with the single-strand wire cable, $a$, encircling the shaft $e$, as set forth, so the barb A may revolve in the direction of the length of the wire $a$, for the purpose set forth.

TYLER C. LORD.

Witnesses:
WM. J. HUTCHINS,
THOS. H. HUTCHINS.